Feb. 26, 1929.

C. F. KILGORE 1,703,309

GRAIN SHOCKING MACHINE

Filed July 24, 1925    9 Sheets-Sheet 1

Inventor
CHARLES F. KILGORE
By his Attorneys

Feb. 26, 1929.

C. F. KILGORE 1,703,309

GRAIN SHOCKING MACHINE

Filed July 24, 1925     9 Sheets-Sheet 4

Inventor
CHARLES F. KILGORE
By his Attorney

Feb. 26, 1929.

C. F. KILGORE 1,703,309

GRAIN SHOCKING MACHINE

Filed July 24, 1925     9 Sheets-Sheet 6

Inventor
CHARLES F. KILGORE
By his Attorney

Feb. 26, 1929.

C. F. KILGORE

1,703,309

GRAIN SHOCKING MACHINE

Filed July 24, 1925   9 Sheets-Sheet 7

Inventor
CHARLES F. KILGORE
By his Attorney

Patented Feb. 26, 1929.

1,703,309

UNITED STATES PATENT OFFICE.

CHARLES F. KILGORE, OF MINNEAPOLIS, MINNESOTA.

GRAIN-SHOCKING MACHINE.

Application filed July 24, 1925. Serial No. 45,852.

This invention relates to grain shockers, and the primary object is to provide a comparatively simple and light, yet efficient and practical machine, adapted to be drawn along side of a grain binder, to receive bundles of grain therefrom, to form bundles into shocks, and to deliver and arrange such shocks upon the ground in substantially the same, but in a more uniform and efficient manner than has been done heretofore either by other machines or by hand. More specifically it is my object to provide a wheel supported frame upon which is movably supported a carriage, which in turn supports a sectionally formed receiving basket which is normally in an open or bundle receiving position, and then providing means, which when the basket is supplied with bundles, will close or cone it to form the shock, then tilt and drop the basket, to deliver the shock, and subsequently raise the basket, to free the shock, and return the basket to its initial receiving position, whereupon the succeeding shock is similarly formed, the carriage being moved rearwardly on the main frame, during the setting of the shock, so that it will be substantially stationary with respect to the ground during such time as the machine travels forward. Further and more specific objects together with the particular means employed for accomplishing the various functions and operations of the machine will be fully disclosed in the course of the following specification, reference being had to the accompanying drawings, in which:

Referring to the drawings more specifically and by reference characters, A designates a main frame, the same consisting of a front cross beam 30, a right side bar 31, a pair of spaced left side bars 32 and 33, connected at their rear ends by a short bar 34, and a pair of diagonally arranged bracing rods 35 and 36 which brace the side frame members 31, 32, and 33, with respect to the forward cross beam 30. The frame is supported, at one side, by a pair of caster wheels 37 and 38 and at its other or left side by a larger or bull wheel 39 which is mounted between the frame members 32 and 33. The frame is provided at its front end (see Fig. 2) with a suitable draft bar 40, by which the machine may be drawn along side of the binder B from which it receives the grain bundles to be shocked, as will be later described in detail.

Figure 1:
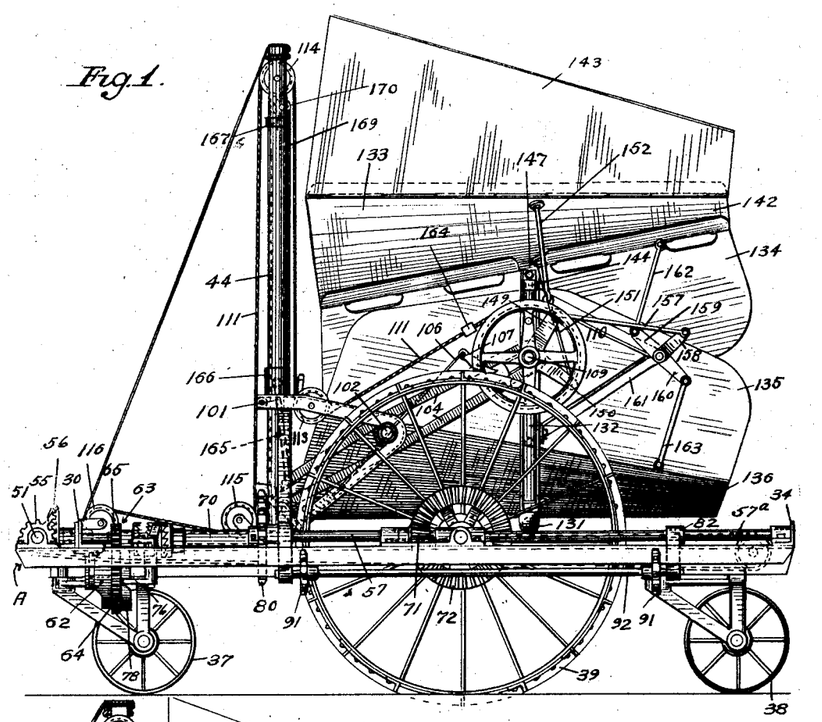
Figure 1 is a side elevation of the machine, as seen from the left, with the bundle basket in an open or bundle receiving position.
Figure 2:
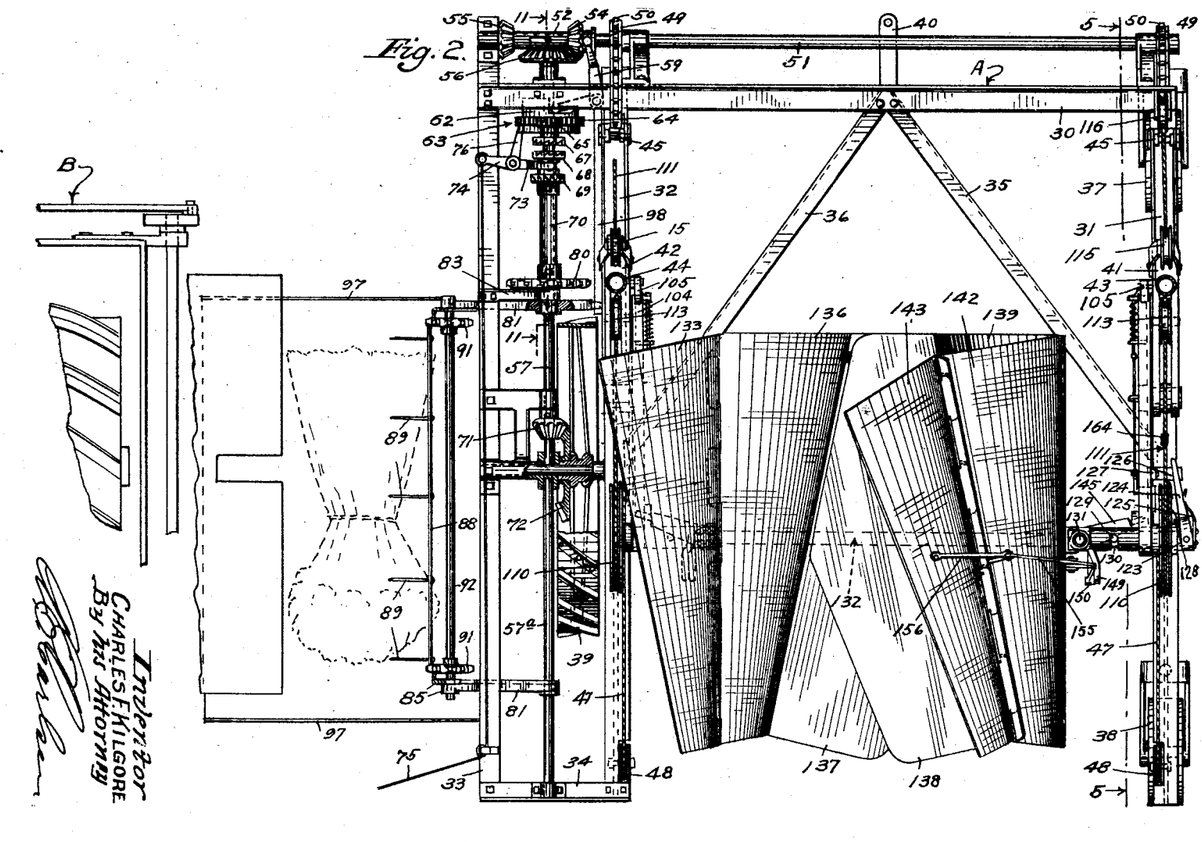
Figure 2 is a top or plan view of the machine as shown in Figure 1, and showing a portion of an ordinary grain binder together with which the shocker is associated when travelling over the field.
Figures 11, 12, 13, 14, 15:
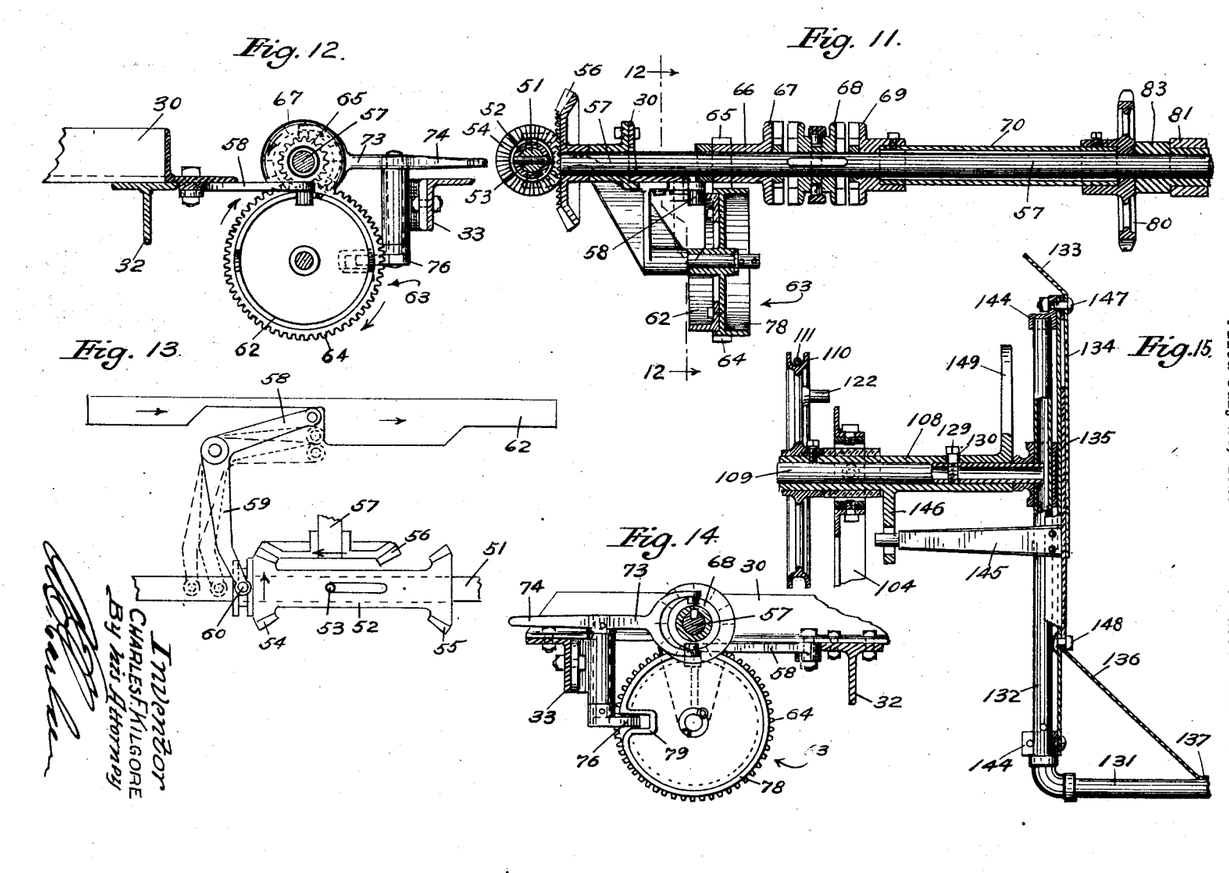
Figure 11 is an enlarged detail sectional view as seen substantially on the line 11 in Figure 2.
Figure 12 is a section on the irregular line 12—12 in Figure 11.
Figure 13 is a diagrammatic detail view showing a certain control cam and parts operated thereby.
Figure 14 is a detail sectional view as on the line 14—14 in Figure 16, showing a clutch and cam locking device.
Figure 15 is a partly sectional detail view about as on the line 15—15 in Fig. 3, illustrating certain basket frame operating parts.
Figures 16, 17, 18:
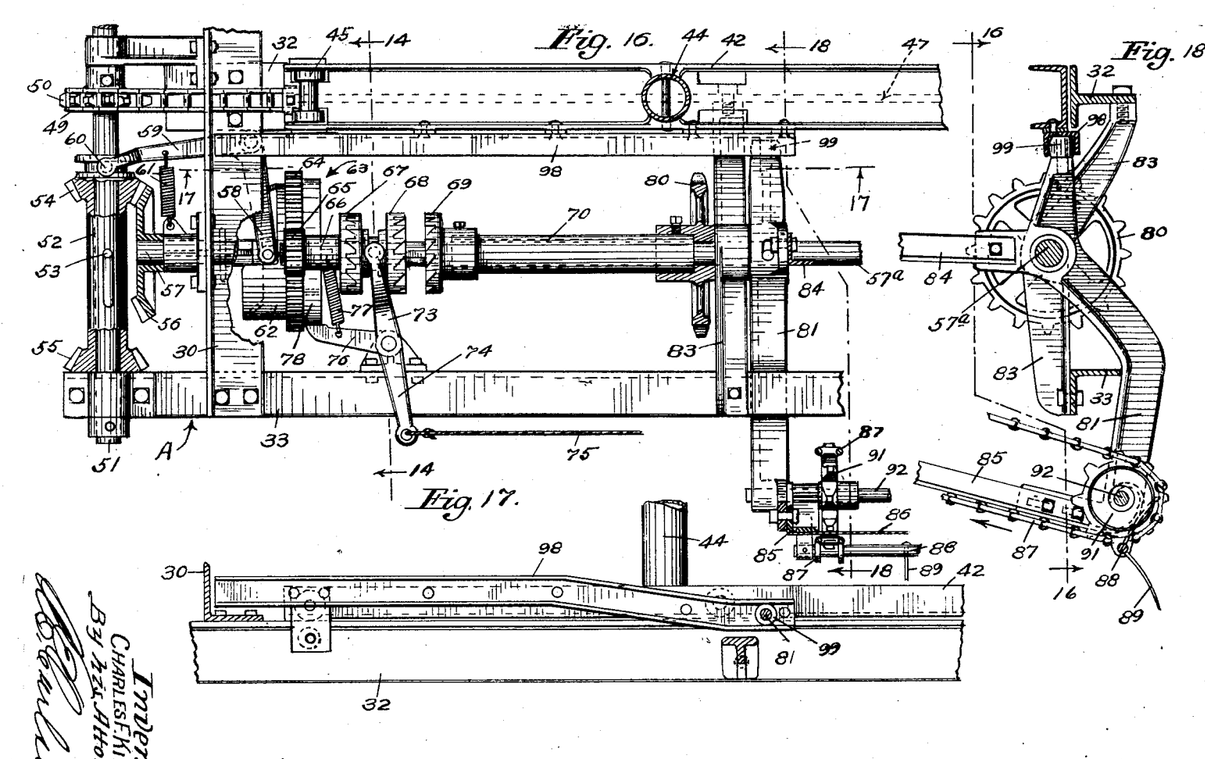
Figure 16 is an enlarged detail plan view partly in section, showing the construction of the main operating mechanism.
Figure 17 is a sectional elevation about as on the line 17—17 in Figure 16.
Figure 18 is a sectional view as on the line 18—18 in Figure 16.

Mounted for a limited longitudinal movement upon the frame A is a carriage consisting of a pair of base members 41 and 42 having hollow standards 43 and 44 rigidly secured thereon and for movement therewith. The base members are provided with suitable rollers 45 for rolling engagement with the main frame. The rear end of each base member is adjustably connected, as at 46, to the end of a cable 47, which passes over and under a pulley 48, in the main frame. The other or under ends of these cables are joined to the ends of sprocket chains 49, which pass over sprocket gears 50 and have their upper ends secured to the front ends of the carriage base members 41 and 42, so that when the gears 50 are rotated they will effect a forward or rearward movement of the entire carriage on the main frame of the machine. The gears 50 are secured on and rotated by a shaft 51 which is journaled in suitable bearings on the main frame. Near its left end the shaft 51 is provided with a sleeve 52 which is slidably secured by a pin 53. The ends of the sleeve 52 are provided with small bevel pinions 54 and 55 adapted to be respectively engaged and rotated by a bevel gear 56 on a longitudinally extending shaft 57 which is suitably journaled in the main frame between the members 32 and 33. The sleeve 52 is moved with its pinions into either operating position, or to a neutral position by a bell crank lever 58—59 having a yoke or fork 60 which rotatably engages the sleeve, as shown in Figures 2, 13, and 16. The three positions of the lever 58—59 are clearly indicated in Figure 13. A spring 61 is associated with the lever in such a way as to tend to retain the pinion 54 in engagement with the gear 56 (Fig. 16). The lever 58—59 is actuated or moved into the three stated positions by a cam acting flange 62 of a drum 63 which is rotatably mounted below the shaft 57. The arm 58 is held in continuous engagement with the edge of the flange, the irregular contour of which is shown, in plan, in Figure 13. The drum 63 is provided with a ring gear 64 which meshes with a pinion 65 of a collar 66 which is rotatable (when idle) on the shaft 57. The sleeve 66 has a toothed clutch face 67 adapted to be engaged by one end of a double clutch member 68 which is slidably keyed on the shaft 57, while a similar, but opposed clutch face 69 is secured on the end of a long sleeve 70 which is also rotatable, when not engaged, on the shaft 57. The shaft 57 is constantly rotated, when the machine is moving, by a bevel pinion 71 which meshes with a bevel gear 72 on the traction or bull wheel 39. The position of the clutch member 68 is determined by a tripping lever 73 having an arm 74, to which is attached a cord 75 adapted to be pulled by the operator of the binder, and a second arm 76, which is yieldingly pressed by a spring 77, against the periphery of a flange 78 of the drum 63. This flange, as shown in Figure 14 has a recess 79, into which the lever arm 76 may drop, as shown in Figures 1 and 14, and is normally so engaged until the operator trips the lever 74, thus throwing the clutch 68 out of engagement with the member 69, and into engagement with the member 67. This tripping action causes the drum 63 to rotate, and the arm 76 rides on the surface of the flange 78 until it has made one complete revolution, at which time the arm will drop back into the recess, by the action of the spring 77, and returns the clutch to its initial operating position. At this time also the crank arm 68 will drop back to the position shown in Figures 13 and 16, returning the pinion 54 to engagement with the gear 56.

A sprocket gear 80 is secured on the sleeve 70 and operates the bundle elevator when the shock forming mechanisms are idle, and in turn becomes idle when the shocking operation takes place.

Figure 10:
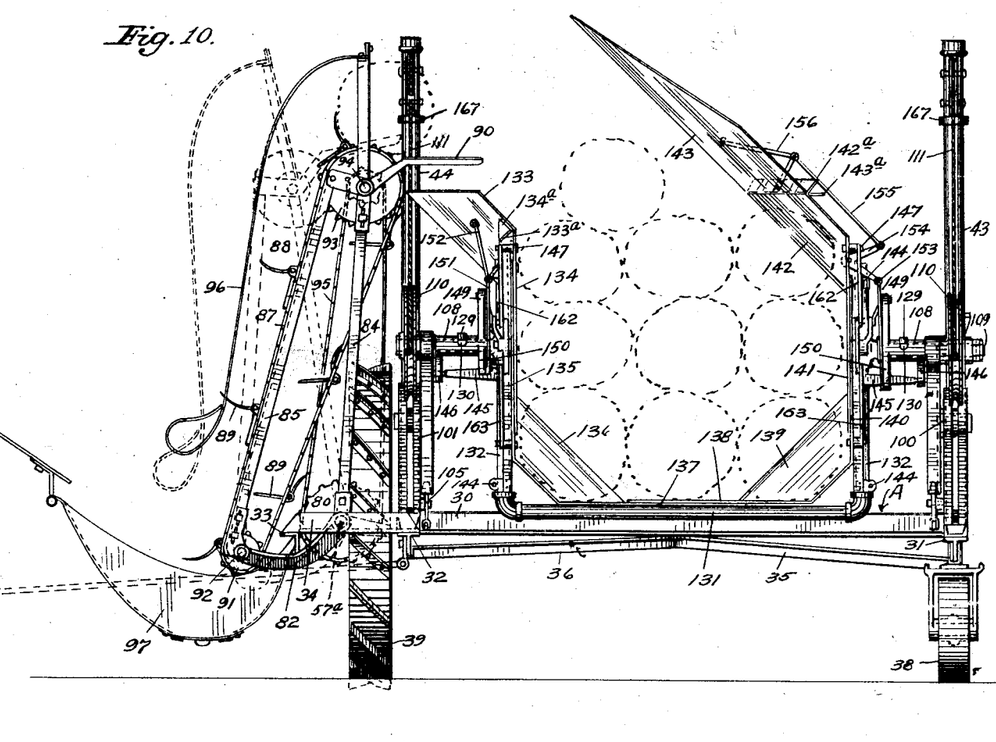
Figure 10 is a rear view of the machine as shown in Figure 2.

The bundle elevator, which delivers the bundles from the binder to the bundle basket, is shown in Figure 10, and partially in Figures 1, 2, 16, 17, and 18. It comprises a pair of brackets 81 and 82, the first being tiltable on a hub of the shaft (57) bearing 83, and the second being tiltably mounted on an idle shaft 57ª, which is in alignment with the shaft 57. A skeleton elevator frame is carried on these brackets 81, 82, and consists of upright members 84, 85 having a platform 86 (Fig. 16) over which travels an endless conveyor consisting of sprocket chains 87 connected by cross bars 88. These cross bars are provided with tines 89 which are erect as they pass up the platform 86, but fall back idle when they reach the top of the conveyor, so that the elevated bundles will be discharged out over a small platform 90 and into the bundle basket. The erection of these tines is effected by right angular extensions which ride on a deck or bars of the conveyor frame. The chains 87 pass under idle sprockets 91 on a shaft 92, at their lower ends, and at their upper ends, pass over sprocket gears 93, on a shaft 94 which is driven from the gear 80 by a chain 95. One or more suitable spring guards 96 (Fig. 10) are secured to the conveyor frame in such a manner that they will support and guide ascending bundles and prevent them from falling off of the conveyor. The bundles are, of course, picked up by the lower end of the conveyor after they have been delivered from the binder into a suitable receptacle such as indicated at 97.

When the shock forming operation is to take place the bundle conveyor mechanism is tilted out of the way as shown by dotted lines in Figure 10. This is accomplished by means of a partly inclined and partly horizontal track 98 (see Figs. 2, 16, 17, and 18) which is secured to the carriage base 42 so as to travel with it on the main frame. The bracket 81 has, at its inner end, a small roller 99, which guides in the channel or track 98. A portion of this track is so inclined that when the carriage is moved rearward the roller will rise high enough so as to effect the desired outward tilting of the conveyor, and will return the conveyor to its normal operating position upon being returned to its normal forward position on the main frame.

Figures 21, 23:
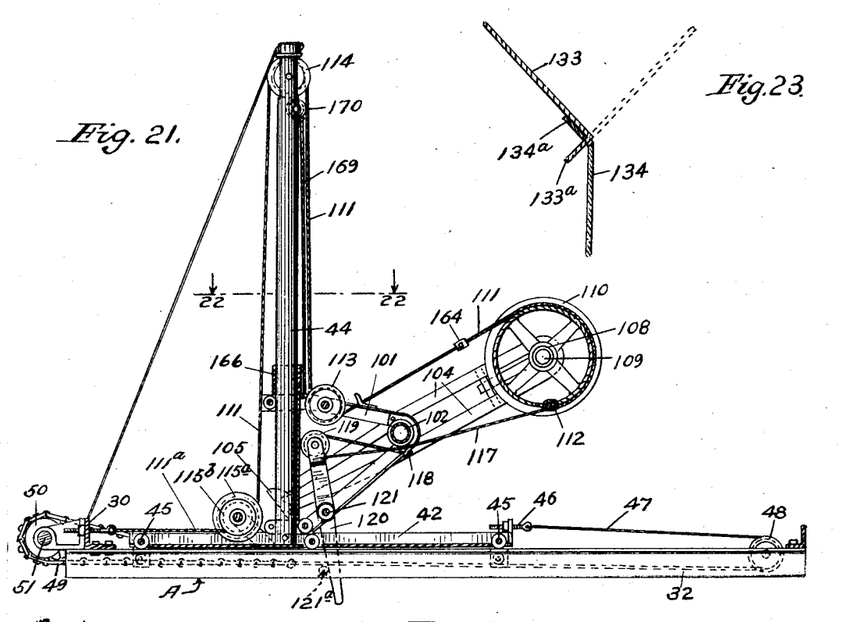
Figure 21 is a sectional elevation similar to Figure 5, but showing certain modifications thereover.
Figure 23 is an enlarged detail section through one of the hinge like corners of the bundle basket.
Figure 22:
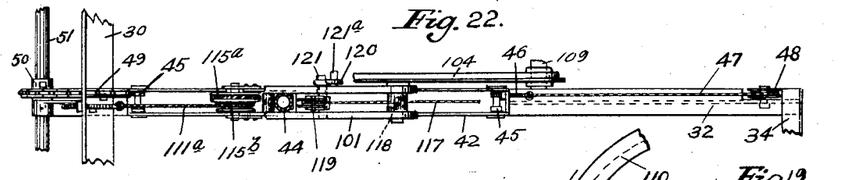
Figure 22 is a plan view of the structure shown in Figure 21, about as on the line 22—22 therein.

Slidably secured upon the standards 43 and 44 is a pair of substantially triangularly shaped frames 100 and 101 to which are tiltably secured as at 102, tilting frames 103 and 104 which, at their rear ends, carry the bundle basket. The forward ends of these frames are releasably held down by dogs 105, which are pivotally secured to the frames 100 and 101, and which are arranged to be tripped or released by pull cords or rods 106, the upper ends of which are secured to arms 107 on the frames 103, 104. In the outer or rear ends of the frames 103—104 are arranged bearings which carry sleeves 108 and shafts 109. Upon the sleeves 108 are rigidly secured large pulleys 110. A cable 111 is secured at one end, as at 112, to each large pulley and passes partly around it. This cable then passes under a pulley 113 in the triangular frame, thence over a pulley 114 in the upper end of the standard, then under a pulley 115, and its rear end is then secured to the carriage after having been passed about a pulley 116 on the main frame. In the modification shown in Figures 21 and 22, the cable 111 terminates at the pulley 115$^a$ and a smaller pulley 115$^b$ has a short cable 111$^a$ which is secured at one end thereto and with its other end at the cross beam 30; whereby the speed or movement of various parts will be changed somewhat from that of the structure shown in the other figures.

Each side of the machine is also provided a cable 117, which is secured at one end to the pulley 110 (Fig. 21) and its other end is secured, as at 118, to the frame 101, after first having been passed over a pulley 119, in the upper end of a lever 120, pivoted as at 121. The lower end of this lever is arranged to co-operate with a stop or pin 121$^a$, on the main frame, so that the pulley 119 will be moved backward and forward with, but faster than, the carriage, and this will also impart a certain predetermined movement or rotation of the wheel 110.

Figure 19:
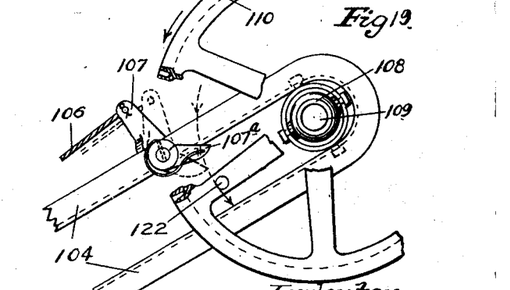
Figure 19 is an enlarged detail view of the bundle basket tripping mechanism, with the frame 104 in its raised position and with various parts broken away for purpose of illustration.
Figure 20:
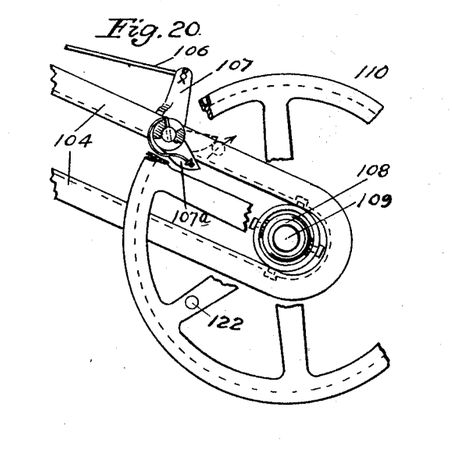
Figure 20 is substantially similar to Figure 19, but with the frame 104 in its lowered position.

The pulleys 110 each have a pin 122 adapted to trip by the springheld dog 107$^a$ of the member 107, when travelling in one direction (as in Fig. 20) so that the arm 107 will not pull or release the rod 106, but, when the pulleywheel travels in the opposite direction, as indicated in Figure 19, it engages the dog 107$^a$ and actuates the member 107 so as to give a temporary pull on the rod or cable 106.

As shown in Figures 2 (right) 24, 25 and 26, the shaft 109 projects beyond the wheel 110, and is provided with a head 123 upon which is pivotally secured a lever 124, the same being springheld inwardly by a spring 125. This lever normally engages and stops against a tooth 126 on a cross bar 127 of the frame 104, but is arranged to be disengaged therefrom by a cam tooth 128 on the wheel 110. Thus the pulley wheel will have a certain limited movement before the sleeve 108 can rotate, which, as will soon be also described, has the effect of closing and coning the bundle basket before it is to be tilted to deliver the shock. The shaft 109 and sleeve 108 are respectively provided with a pin 129 and slot 130 (see Figs. 2, 10, and 15) to limit the oscillating movement of the sleeve and shaft with respect to each other.

The bundle basket is carried by a U-shaped frame, consisting of a cross member 131 and upright side members 132, the latter of which turn with and are carried by the inner ends of the shafts 109. The basket itself is sectionally formed. The sections 133 to 137, inclusive, are all carried by trunnions 144, so that the left frame bar 132 will act as a vertical pivot for them to swing on, while the remaining sections 138 to 143 inclusive, will swing on the opposite frame member, so that when the front portion of the basket is spread, transversely, its rear end will become smaller. This lateral coning of the basket is effected by lever arms 145 which are engaged by extensions 146 of the sleeves 108 (Fig. 15).

Figure 3:
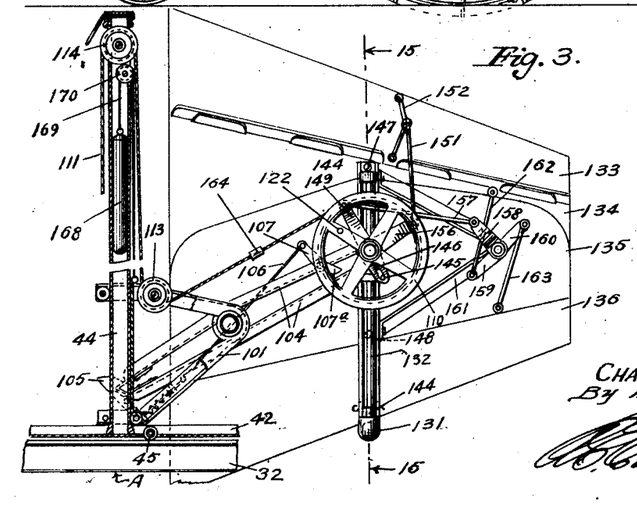
Figure 3 is a sectional elevation of a part of the machine, showing the bundle basket closed and coned as at the completion of the first movement in the shocking operation.
Figure 4:
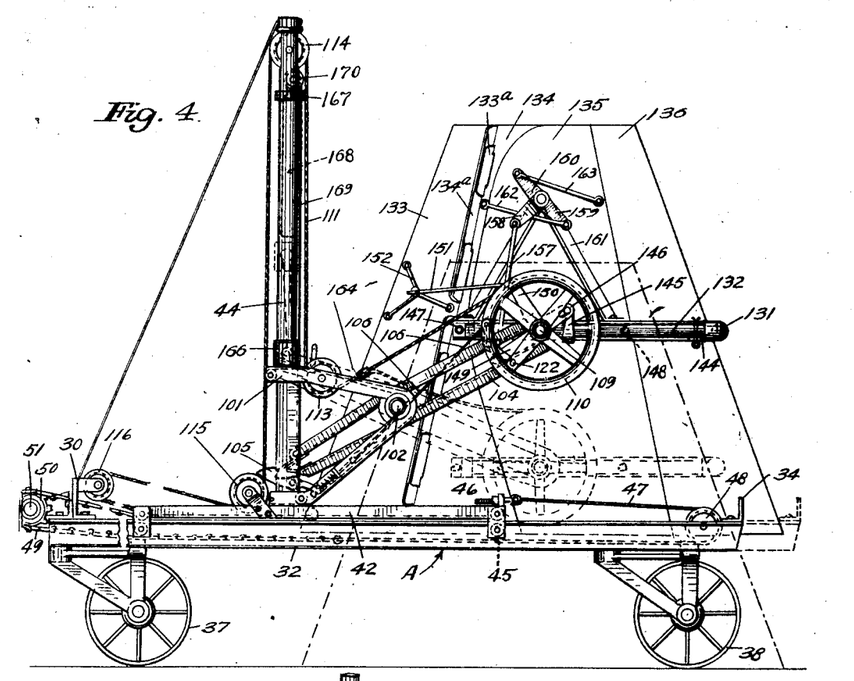
Figure 4 is a side elevation of the machine as seen when the bundle basket has been turned to a vertical or shock delivering position.
Figure 6:
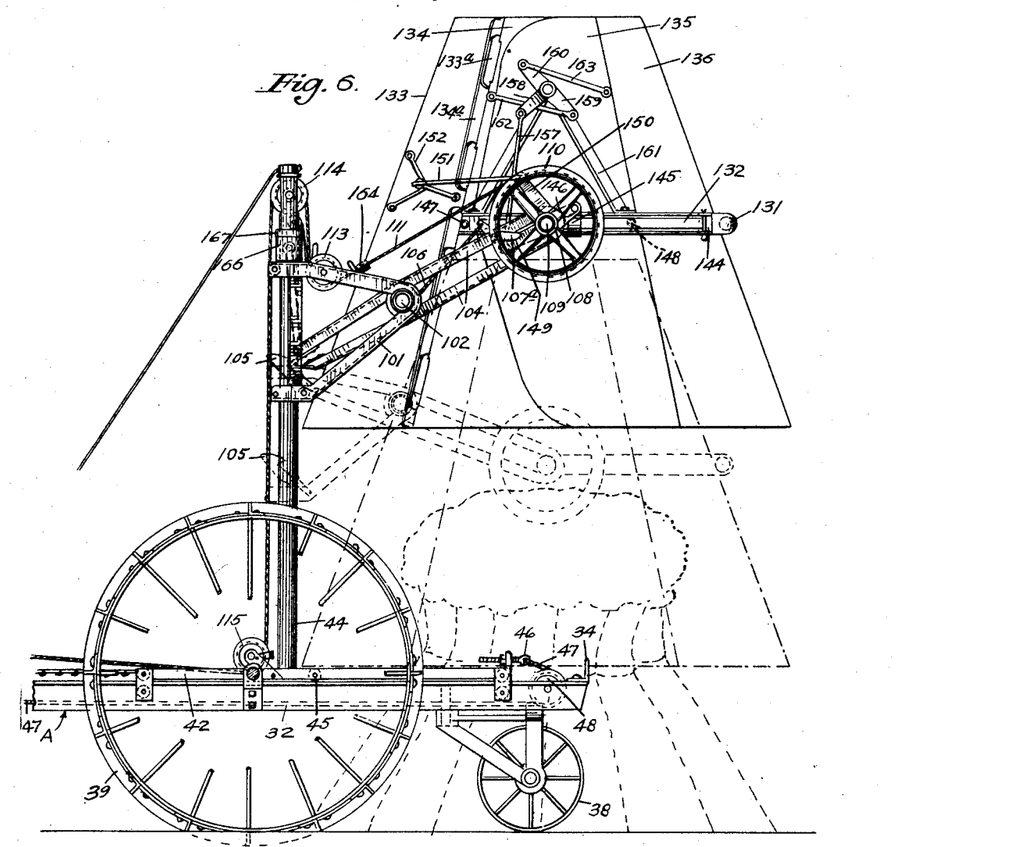
Figure 6 is a side elevation of the rear end of the machine, showing the bundle basket elevated to its uppermost position to clear the shock that has been set.
Figures 7, 9:
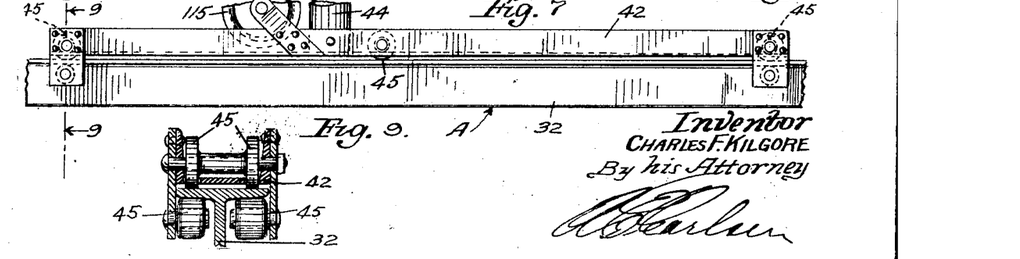
Figure 7 is a side view of the lower end of the supplemental frame.
Figure 9 is an enlarged detail section on the line 9—9 in Figure 7.
Figure 8:
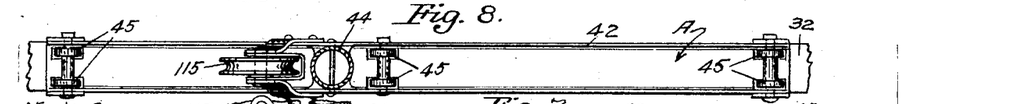
Figure 8 is a plan view of the structure shown in Figure 7.

The basket section groups 133, 132, and 141, 142, 143, also swing or operate on transverse pivots 147 of the basket frame, while the lower section groups 135, 136, 137, and 138, 139, 141, operate on similar pivots 148, at the lower corners of the basket frame, with a result that when the basket is open, as in Figures 1, 2, and 10 it comprises a substantially rectangular receptacle, but when closed, as in Figures 3, 4, and 16, it is substantially frustro-conical in shape, and thus forms a correspondingly shaped shock, as shown in Figure 6.

In order that the basket sections may properly co-operate to perform the desired closing and coning operation, it is necessary to hinge the cover or closing sections 133 and 143 to their adjoining sections. This I do in a very efficient and novel manner as shown particularly in Figure 23. Thus, at the juncture of the two sections they are each provided with slots and tongue portions 133$^a$ and 134$^a$ the tongues of one section being engagable in the slots of the adjoining section. The tongue portions of both sections are arranged at such an angle that they will support the hinged section in its proper open or closed position and will not permit it to go therebeyond.

The coning of the basket is completely effected by devices (other than those above described) which may be set forth as follows: The sleeves 108 are provided with angularly arranged arms 149 and 150. A link 151 (on the left side of the machine) connects the arm 150 to a bracket 152 on the section 133, in such a manner that when the arm 150 is raised, by the rotation of the sleeve, it will close the section 133 inwardly. On the right side of the machine a similar link 153 operates a bell-crank-lever 154 (on the section 141—142) so as to open and close the section 143 by a link rod 155 and bracket 156.

The sleeve arms 149, on the opposite sides of the basket, have link members 157 which operate three-armed bell-crank-levers 158—159—160 which are pivotally secured to brackets 161 of the basket construction. The arms 159 are connected by links 162 to the sections 134 and 141, and the arms 160 are connected by links 163 to the sections 135 and 140, so that when the links 157 are pulled with respect to the frame members 161 it will pull the links 162 and 163 and thereby contract the rear end of the basket, vertically.

The operation of the machine will now be described, and the progressive steps, from the receiving of the bundles to the delivery of the shock and the return of the various parts to their initial positions, will be set forth.

Figure 24:
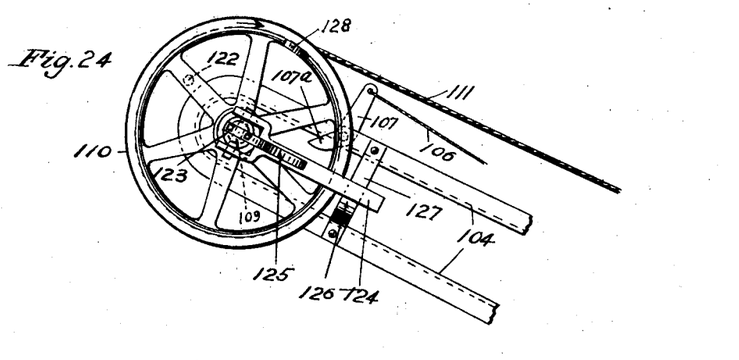
Figure 24 is an enlarged detail view of a portion of the basket tripping mechanism carried on the right side of the machine.
Figure 25:
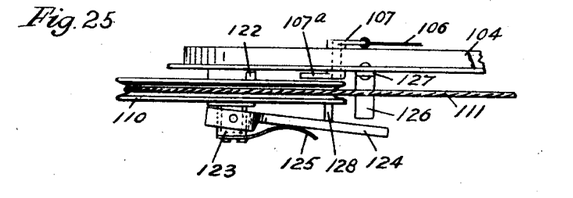
Figure 25 is a top view of the structure shown in Figure 24.
Figure 26:
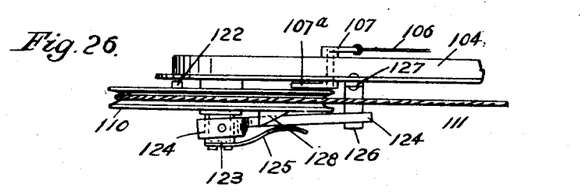
Figure 26 is similar to Figure 25 except that the cam dog 128 is shown as out of engagement with the arm 124.

As the machine moves over the ground in a receiving position with respect to the binder B, as shown in Figures 2 and 10, the basket 133—143 is open, as in Figures 1, 2, and 10, and the clutch 68 is engaged with the member 69 and drives only the bundle elevator which transfers the bundles from the binder to the basket. All other parts of the machine remain idle until a sufficient number of bundles have been delivered to form a shock of the desired size. At such time the operator of the binder gives a jerk to the cord or cable 75, thus disengaging the clutch 68 from the member 69, to render the elevator inactive and re-engaging the clutch with the member 65. This movement also withdraws the arm 76 from the notch 79 and permits the drum 63 to be rotated by the pinion 65. At this time the cam 62 is in such position that the bell-crank 58—59 is fully retracted, by the spring 61, and the pinion 54 is in engagement with the bevel gear 56, thus causing the shaft 51 to rotate in a clockwise direction, when looking from the left of the machine. By reason of the sprocket pinions 50 and flexible members 47 and 49 the carriage 41 will now start to move rearwardly on the main frame A, and in so doing will cause a forward pull on the cables 111. This initial rearward movement of the carriage raises the roller 81 in the channel 98, thus disengaging the elevator and moving it outwardly as previously described. The initial pull on the cable 111 also rotates the pulley wheels 110 approximately ninety degrees, and in so doing rotates the sleeves 108 enough to actuate the members 146, 149, and 150, to close the basket sections 133 and 143 and actuate all the sections in such a manner as to completely cone the basket and form the bundles into the shock. The basket is prevented from tilting, during this time, by the shaft arm 124 which is spring-held in engagement with the dogs 126 (Figs. 24, 25, 26). As the carriage continues to move rearwardly, however, the cam dogs 128 disengage the members 124 and 126, and the sleeves 108 stop on the pins 129 so as to rotate the shafts 109 and the basket and basket frame with the wheels. The basket is now tilted to the vertical position shown in Figure 4, and can go no further because of stop lugs 164 on the cables 111. Immediately, before the cable is stopped, however, the pin 122 of the wheel 110, acts against the pawl 107$^a$ to pull the cable or rod 106 which releases the latch dog 105. This action releases the frame 104 and permits the basket and the formed shock to drop down upon the ground, as indicated by dotted lines in Figure 4.

Figure 5:
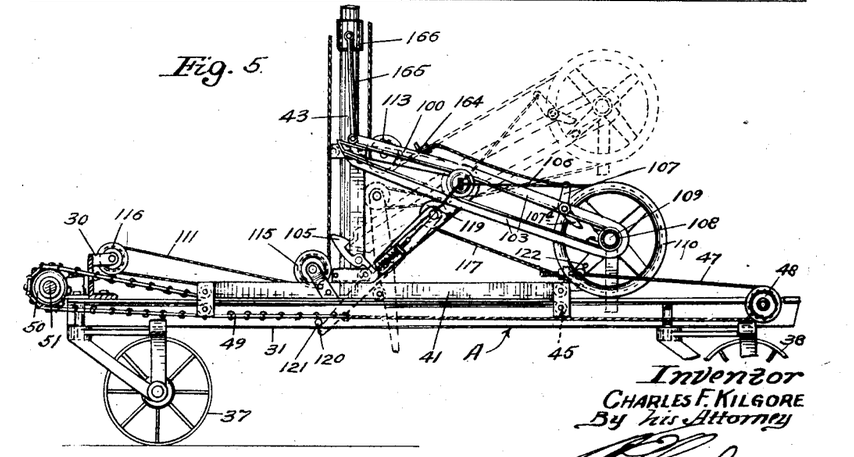
Figure 5 is a sectional elevation as seen substantially on the line 5—5 in Figure 2.

As the cables 111 have reached their limits with respect to the frames 101, the frames themselves start upward on the standards 44. The forward ends of the frames 103 and 104 are connected by links 165 to collars 166 which slide on the standards 43—44, above the triangular frames 101. These collars 166, in the present condition of the machine, are not raised, with respect to the frames 101, as in Figure 5, and as the frames approach the tops of the standards the collars will stop against stationary collars 167, and in so doing will hold the fore ends of the frames 104 stationary until the dogs 105 are raised high enough to engage the frames 104, as shown in Figure 6. This will of course, cause the basket to raise (away from the set shock) at a considerably greater speed than that of the frames 101, thus insuring a proper clearance of the basket as the machine continues to move away from the shock.

As the basket and its raising and operating mechanism reach the elevated position, shown in Figure 6, the bell-crank arm is actuated into its second or intermediate position on the edge of the cam flange 62, and in so doing throws the sliding gear member 52 in a neutral or inoperative position with respect to the bevel gear 56. The carriage is now in its rearmost position and the basket is fully elevated, in which position these parts remain stationary with respect to the main frame until the shock is fully cleared. When this has been accomplished, the arm 58 is raised to its third position on the cam 62, thus sliding the pinion 55 into engagement with the gear 56 and reversing the rotation of the shaft 51, and this, in return, reverses the operation of the various parts and brings them back to the initial positions shown in Figures 1, 2, and 10. At this time the drum 63 has made a complete revolution and the arm 76 again drops into locking position in the pocket or recess 79, thus releasing the shock forming mechanisms and re-engaging the bundle elevator. The frames 101 and the mechanisms which are vertically movable with them are preferably counterbalanced by weights 168 which are associated with the frames by cables 169 riding on pulleys 170.

It is understood that various modifications may be made in the general design and structural details of the invention as herein illustrated and described, providing, however, that such modifications come within the spirit and scope of the appended claims.

Having now, therefore, fully shown and described my invention, what I claim to be new and desire to protect by Letters Patent is:—

1. In a shocking machine, a wheel supported frame adapted to be drawn along side of a binder, a basket mounted in the machine and normally in an open, forward position, means for actuating the basket to close it, to form a shock, tilt it and move it rearwardly on the machine to deliver the shock and then return it to its normal, open and forward position, a conveyor for transferring bundles from the binder to the basket, means for actuating the conveyor and means for engaging and disengaging the basket and conveyor actuating means said conveyor being tiltably mounted on the machine, and means for tilting the conveyor outwardly when the basket is in motion with respect to the frame of the machine.

2. In a shocking machine, a wheel supported frame adapted to be drawn along side of a binder, a basket mounted in the machine and normally actuating the basket to close it, to form a shock, tilt it and move it rearwardly on the machine to deliver the shock and then return it to its normal open and forward position, a conveyor tiltably mounted upon the frame, means for driving the conveyor whereby it will deliver bundles from the binder to the basket, means for tilting the conveyor outwardly when a shock is to be formed by the basket, and means for disengaging the shock forming and return movements of the basket.

3. A shocking machine adapted to be drawn along side of a binder and comprising a main frame, a carriage longitudinally movable on the frame, a bundle receiving and shock forming basket carried by and movable vertically with respect to the carriage, means for conveying bundles from the binder to the basket, means for closing the basket to form a shock, means for tilting and dropping the basket to deliver the shock, means for raising the basket and moving the carriage rearwardly so the basket will clear the shock as the machine moves forward, and means for returning the basket and carriage to their initial position.

4. A shocking machine adapted to be drawn along side of a binder, and comprising a main frame, a carriage longitudinally movable on the frame, a bundle receiving and shock forming basket carried by and movable vertically with respect to the carriage, means for conveying bundles from the binder to the basket, means for closing the basket to form a shock, means for tilting and dropping the basket to deliver the shock, means for raising the basket and moving the carriage rearwardly so the basket will clear the shock as the machine moves forward, and means for returning the basket and carriage to their initial positions, means for rendering idle the bundle conveying means when the shock forming operation begins, and means for rendering said conveying means active upon the return of the basket to its initial position.

5. A grain shocking machine adapted to be drawn at the side of a binder, and comprising a main frame, a carriage mounted for longitudinal movement on the main frame, a bundle receiving and shock forming basket carried by the carriage, a conveyor tiltably mounted upon one side of the frame for conveying bundles from the binder to the basket when the carriage is in a forward position, said conveyor being operatively associated with said carriage whereby when the carriage is moved rearwardly, the conveyor will tilt outwardly, and when the carriage is returned to its forward position, the conveyor will be tilted inwardly.

6. A grain shocking machine adapted to be drawn at the side of a binder, and comprising a main frame, a carriage mounted for longitudinal movement on the main frame, a bundle receiving and shock forming basket carried by the carriage, a conveyor arranged in a normally active position with respect to the basket when the carriage is in a forward position, and means for moving the conveyor to an inactive position when the carriage is moved rearwardly of its normal forward position.

7. A grain shocking machine adapted to be drawn at the side of a binder, and comprising a main frame, a carriage mounted for longitudinal movement on the main frame, said carriage being provided with a track having a portion thereof inclined, a bundle receiving and shock forming basket carried by the carriage, a conveyor mechanism tiltably mounted on the main frame for delivering bundles into the basket, said conveyor mechanism having a guiding member engaging said track whereby the conveyor mechanism may be tilted when said guiding member engages the inclined portion of the track as the carriage is moved back and forth.

8. A grain shocking machine adapted to be drawn at the side of a binder and comprising a main frame, a carriage mounted for longitudinal movement on the main frame, said carriage being provided with a track having a portion thereof inclined, a bundle receiving and shock forming basket carried by the carriage, a conveyor mechanism tiltably mounted on the main frame for delivering bundles into the basket, said conveyor mechanism having a guiding member engaging said track whereby the conveyor mechanism may be tilted when said guiding member engages the inclined portion of the track as the carriage is moved back and forth, means for rendering the conveyor mechanism active when the carriage is in its forward position and means for rendering the same idle when the carriage is moving with respect to and on the main frame.

9. A shocking machine comprising a wheel supported main frame, a carriage movable longitudinally on the main frame and normally in a forward position, a second carriage movable vertically on the first mentioned carriage, a bundle basket carried by the second carriage, and means for operating the basket and said carriage to form and set and release a shock.

10. A machine of the character described comprising a wheel supported main frame, a carriage mounted for longitudinal movement on the main frame and including a pair of standards, a pair of basket supporting frames mounted for vertical movements on said standards, and a bundle receiving and shock forming basket carried by said supporting frames.

11. A machine of the character described comprising a wheel supported main frame, a carriage mounted for longitudinal movement on the main frame and including a pair of standards, a pair of side frames mounted for sliding movement on said standards, a pair of levers fulcrumed to said side frames, and a bundle receiving and shock forming mechanism carried by said levers.

12. A machine of the character described comprising a wheel supported main frame, a carriage mounted for longitudinal movement on the main frame, a pair of side frames mounted for vertical movements on the carriage, and a bundle receiving and shock forming mechanism carried by said side frames.

13. A machine of the character described comprising a wheel supported main frame, a carriage mounted for longitudinal movement on the main frame, a pair of side frames mounted on the carriage, a basket for receiving bundles and forming a shock, and lever members carried by the side frames and adapted to carry the basket.

14. In a shocking machine, a wheel supported main frame, a pair of lever members mounted for vertical and longitudinal movements on the main frame, and a shock forming basket carried by said lever members.

15. In a shocking machine, a wheel supported main frame, a pair of lever members mounted for vertical and longitudinal movements on the main frame, a normally open basket carried by said lever members, means for closing and tilting the basket and subsequently moving the lever members rearwardly and upwardly, as and for the purpose set forth.

16. In a shocking machine, a substantially U-shaped wheel supported main frame, a carriage mounted for longitudinal movement on the main frame, and a bundle receiving and a shock forming mechanism carried by said carriage, said mechanism including a sectionally formed basket adapted to be raised and lowered with respect to, and be moved horizontally with the carriage.

17. In a shocking machine, a substantially U-shaped wheel supported main frame, a carriage mounted for longitudinal movement on the main frame, and a bundle receiving and a shock forming mechanism carried by said carriage, said mechanism including a sectionally formed basket adapted to be raised and lowered with respect to, and be moved horizontally with the carriage, means for closing the basket before said movements take place, and means for restoring the basket to its initial position.

18. In a shocking machine, a bundle receiving and shock forming basket comprising a series of overlapped sections, the sections forming each side of the basket being mounted to turn on normally vertical centers, and the sections forming upper and lower parts of the basket being mounted to turn with respect to each other on upper and lower transverse centers.

19. In a shocking machine, a bundle receiving and shock forming basket comprising a series of overlapped sections, the sections forming each side of the basket being mounted to turn on normally vertical centers, and the sections forming upper and lower parts of the basket being mounted to turn on upper and lower horizontal centers, and means for simultaneously turning the sections on all of said centers to effect a substantially trunco-pyramidal form to the basket.

20. In a shocking machine, a bundle receiving and shock forming basket comprising a series of overlapped sections, the sections forming each side of the basket being mounted to turn on normally vertical centers, and the sections forming upper and lower parts of the basket being mounted to turn on respective upper and lower horizontal centers, and means for mounting the basket in the machine whereby it may be moved longitudinally and vertically of the machine in conjunction with the turning movements of the basket sections.

In testimony whereof I affix my signature.

CHARLES F. KILGORE.